(12) United States Patent
Peer et al.

(10) Patent No.: US 9,094,447 B1
(45) Date of Patent: Jul. 28, 2015

(54) COMPUTER SECURITY APPLICATION CONFIGURATION STRUCTURE EMPLOYING INDEPENDENTLY SPECIFIED CONFIGURATION OBJECTS AND SEPARATE RESOLVER

(71) Applicant: EMC Corporation, Hopkinton, MA (US)

(72) Inventors: Oded Peer, Raanana (IL); Ika Bar Menachem, Herzelia (IL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/221,608

(22) Filed: Mar. 21, 2014

(51) Int. Cl.
*H04L 29/06* (2006.01)
*G06F 21/55* (2013.01)
*G06F 21/56* (2013.01)

(52) U.S. Cl.
CPC ........ *H04L 63/1433* (2013.01); *H04L 63/1416* (2013.01); *G06F 21/554* (2013.01); *G06F 21/566* (2013.01)

(58) Field of Classification Search
CPC .. H04L 63/1416; G06F 21/554; G06F 21/566

USPC .......................................................... 726/25
See application file for complete search history.

(56) References Cited

U.S. PATENT DOCUMENTS

| | | | |
|---|---|---|---|
| 7,058,821 B1 * | 6/2006 | Parekh et al. | 713/194 |
| 8,117,659 B2 * | 2/2012 | Hartrell et al. | 726/24 |
| 2006/0021055 A1 * | 1/2006 | Judge et al. | 726/25 |
| 2006/0053490 A1 * | 3/2006 | Herz et al. | 726/23 |

* cited by examiner

*Primary Examiner* — Jason K Gee
(74) *Attorney, Agent, or Firm* — BainwoodHuang

(57) ABSTRACT

An information security application responds to a request by generating a context vector and performing a lookup in a configuration structure to identify a configurable action to be taken. The context vector includes current values of environment variables. The configuration structure stores configuration objects having an environment field storing configured values of the environment variables to specify a context for use of an action value in an action field. A wildcard value indicates that the context for use is independent of a given environment variable. The lookup results in a set of configuration objects whose configured values of the environment variables either are wildcards or match respective values in the context vector. The set of action values is resolved to a resolved action value specifying the configurable action, and a response is returned to the client computer based on a result of the configurable action.

20 Claims, 5 Drawing Sheets

US 9,094,447 B1

COMPUTER SECURITY APPLICATION CONFIGURATION STRUCTURE EMPLOYING INDEPENDENTLY SPECIFIED CONFIGURATION OBJECTS AND SEPARATE RESOLVER

BACKGROUND

The invention is related to the field of information security, and in particular to information security applications having configurable operation.

An information security application may employ a configuration structure to store configuration information that is used during operation to tailor operation in a manner that depends on the current operating environment. For example, a user authentication application may employ different authentication criteria depending on whether the user being authenticated is accessing a protected system locally via a protected network or remotely via a public network. The configuration structure stores configuration information specifying this variable operation based on the type of access for which authentication is being requested.

Known configuration structures employ a tree-like hierarchical organization of configuration information in which different variables define the levels of the tree. The organization reflects a predetermined dependence among the variables in terms of their relative weight or importance in determining what action may be taken. In use, an application obtains relevant information as far down in the tree (i.e., as close to a leaf) as possible, so that the most specific configuration information is used for each situation.

SUMMARY

The use of known configuration structures with information security applications can present limitations and difficulties. In some cases the exact interdependence among different variables of operation may not be known or even constant, so that the design of a hierarchical structure is difficult and may not adequately support the operation of an application over a long period. Also, a hierarchical structure does not scale well to a large number of variables or dimensions, because the problem of identifying interrelationships becomes greatly magnified. Modern information security applications, such as risk-based authentication for example, may employ a very large number of different types of risk predictors when assessing the risks of events occurring in a protected system. It may be intractable to define one organization of configuration information that will adequately support the needs of the application to provide high quality risk assessment.

Methods and apparatus are disclosed in which an information security application uses a configuration structure storing independently specified configuration items along with a separate resolver that reflects interdependencies in a resolution strategy used to select among multiple configuration items that may be applicable in a given situation. The disclosed approach can simplify the specification of configuration information and enhance scalability to a large number of dimensions. It can also provide flexibility by enabling the resolution strategy to be changed without requiring a complete restructuring and rebuilding of the configuration structure.

In particular, a method is disclosed of operating a server computer executing an information security application to provide information security services to a client computer. In response to a request from the client computer for a security operation, a context vector is generated and a lookup is performed in a configuration structure to identify a configurable action to be taken as part of the operation. The context vector includes a set of current values of respective environment variables. The configuration structure stores configuration objects each having an environment field and an action field, the environment field storing configured values of the environment variables to specify a context for use of an action value stored in the action field, and the configured values including predefined specific values and a wildcard value indicating that a context for use of the action value of a given configuration object is independent of a given environment variable. The lookup results in identification of a set of the configuration objects whose respective configured values of the environment variables either are wildcards or match respective current values of the environment variables in the context vector.

The set of action values of the identified set of configuration objects is then resolved by a separate resolver to create a resolved action value specifying the configurable action to be taken. Then the configurable action specified by the resolved action value is performed and a response is returned to the client computer based on a result of the configurable action.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
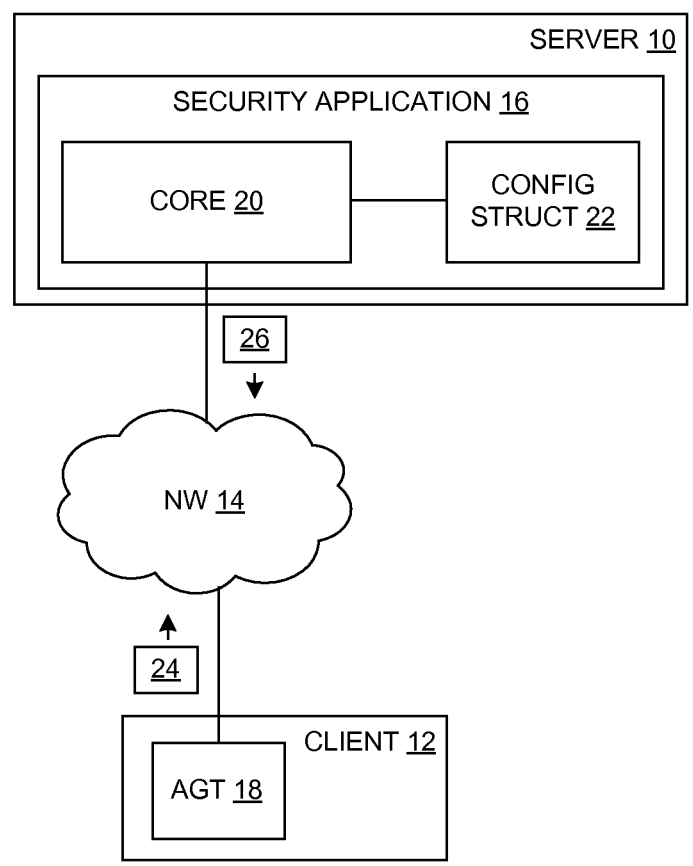
FIG. 1 is a block diagram of a computer system.

FIG. 1 shows a computer system including a server computer or "server" 10 and a client computer or "client" 12, both connected to a data communications network (NW) 14 as generally known in the art. The server 10 executes an information security application 16 that provides information security services to the client 12. In one embodiment, the security application 16 is a user authentication service such as RSA® Adaptive Authentication. The client 12 executes an agent (AGT) 18 that serves as a run-time interface between locally executing applications/processes (not shown) and the security application 16. In one example, the client 12 may be a server providing an online service such as a banking or similar financial service, and the security services of the security application 16 are used to protect the online service from unauthorized access and use. The client 12 authenticates users of the online service using the security services via the agent 18.

The security application 16 can be viewed as having two components, a core component or "core" 20 and a configuration structure (CONFIG STRUCT) 22. The core 20 includes most of the functionality (via instructions and data) of the security application 16, except for aspects of operation that are configurable. The configuration structure 22 is used to store configurable parameters or properties that are used by the core 20 in operation. The configurable parameters may be loaded into the configuration structure by any of a variety of means as generally known in the art. For example, the security application 16 may include an administrative interface or "console" that enables a human user to provide the parameters, either directly via a graphical user interface or indirectly via a configuration file that is processed by the console. The security application 16 may itself initialize certain configurable parameters to default values. Other techniques may be used.

In operation, the security services may be provided using a request-response type of application-level protocol in which the agent 18 generates requests 24 for security-related operations. The security application 16 receives the requests 24, performs the requested security-related operations, and returns responses 26 describing the outcomes of the operations and perhaps including data locally usable by the client 12 in some manner. Referring again to the adaptive authentication example in particular, a request 24 may convey information about a current attempt by a user to access the online service provided by the client 12. The security application 16 uses the information from the request, as well as other data that may be locally stored or available from another location, to calculate a level of risk associated with the attempted access, and returns an authentication result in the response 26. The authentication result could be a hard indication, such as an indication that the access is permitted or denied, or it may be a softer indication or perhaps just data that is processed in some manner by the client 12 to make a local decision based on the information.

When using the information from the request 24 and potentially other data to perform a requested operation, the security application 16 uses the configuration structure 22 to obtain any configured parameters or properties whose values depend in some manner on the current environment, typically including information from the request 24 itself. Referring again to the adaptive authentication example, risk may be calculated differently depending on whether the user being authenticated is logging in locally (e.g., via a company-controlled local-area network) versus remotely (via a public network). Thus, the type of access is an environment variable whose value is used to look up information in the configuration structure 22 specifying how the risk calculation is performed. The security application 16 then uses the retrieved information to formulate a specific risk calculation, and proceeds from there to complete the operation and return an appropriate response. More detail on this operation is provided below.

Figure 2:
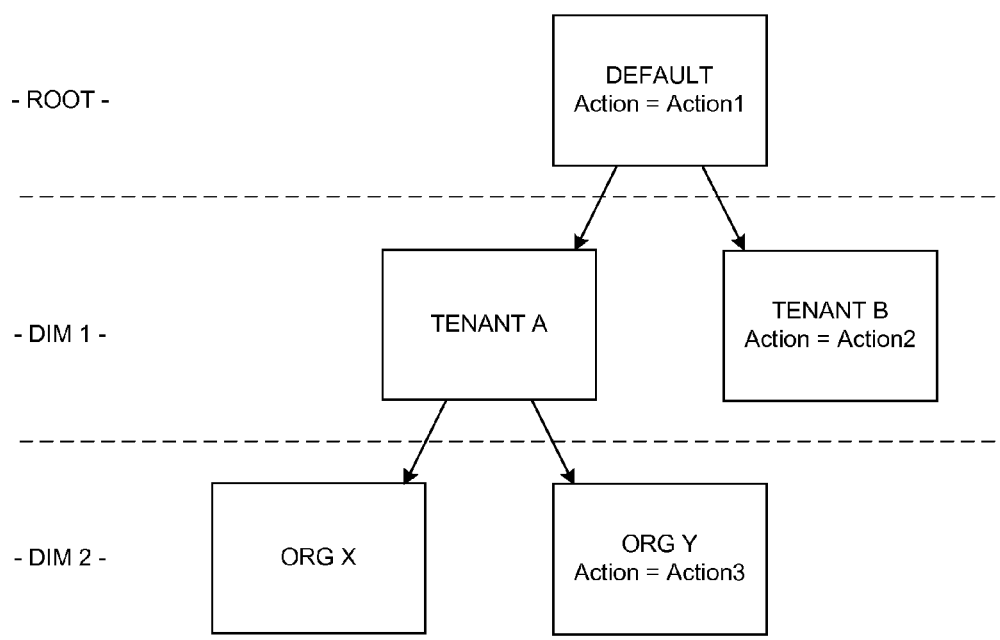
FIG. 2 is a schematic diagram of a configuration structure as known in the art.

FIG. 2 shows an example of a prior art organization of configuration information. As shown, it employs a tree like structure having a root and hierarchically arranged dimensions (DIM x). In this example, two separate dimensions correspond to the identity of a Tenant (dimension 1) and the identity of an Organization (ORG) (dimension 2). This example might be applicable in a hosted environment in which an action to be taken depends on the tenant and organization. When retrieving a configured action, an application attempts to retrieve it as close to a specific leaf as possible. In the illustrated example, the default action value is shown abstractly as Action1. Any refinement depends on the identities of the tenant and organization. If the tenant is identified as Tenant B, then the action value Action2 is used. If the tenant is Tenant A, then any further refinement depends on identity of the organization. If the organization is identified as Organization X, then no overriding action is specified and the default value Action1 is used. If the organization is Organization Y, then the action value Action3 is used.

In the simplified example above there are a small number (2) of dimensions and a clear order of importance between dimensions, i.e., it will always be the case that the Tenant value has greater weight or importance than does the Organization value. Thus the hierarchical organization lends itself in particular to collections of configuration information having these properties—a small number of dimensions, and clear order among them. The hierarchical organization becomes difficult if not intractable as the number of dimensions grows large. It may not be clear whether one dimension is always more important than another. Also, relative importance might change over time, which would require completely rebuilding the collection of configuration information to reflect a new ordering among the dimensions.

Figure 3:
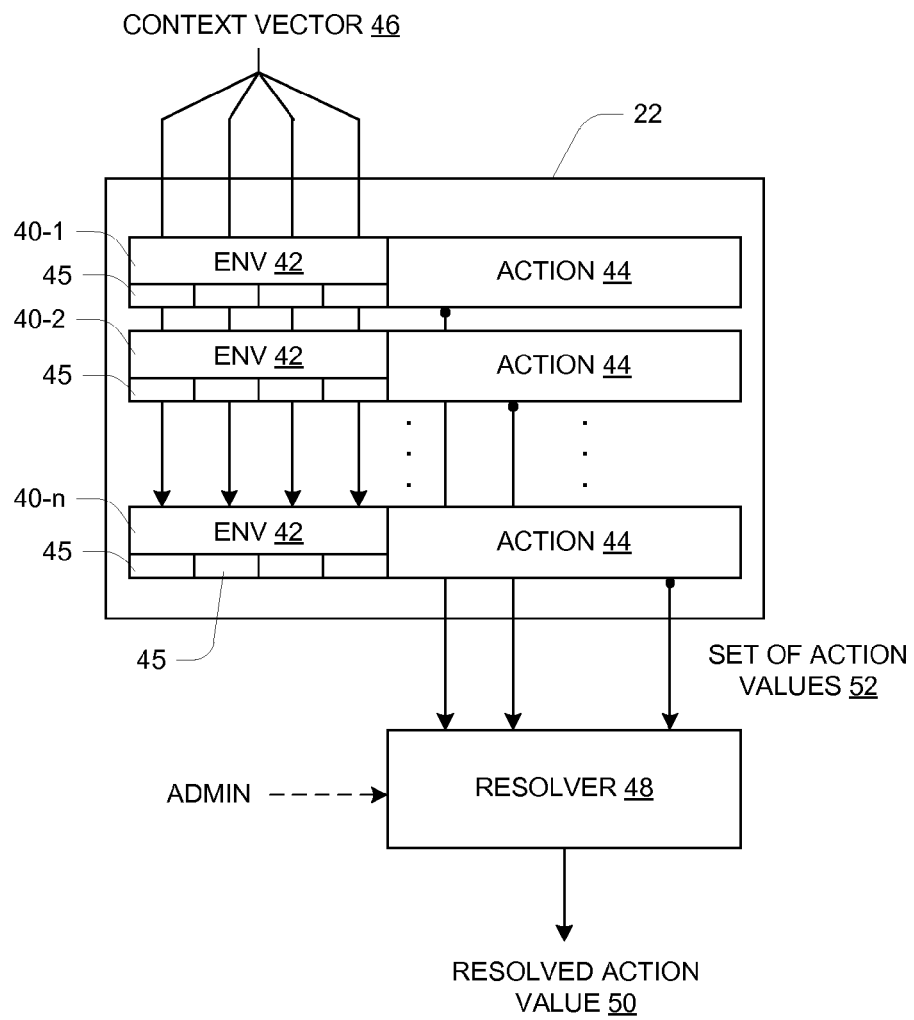
FIG. 3 is a schematic diagram of a configuration structure and its use.

FIG. 3 shows the organization and use of the configuration structure 22 of FIG. 1 in some detail. It includes an array of configuration objects 40-1, 40-2, . . . , 40-$n$ (generally 40), each of which has environment field (ENV) 42 and one or more action fields (ACTION) 44. Each configuration object 40 specifies a configurable action or actions by (1) in the environment field 42, identifying a particular condition of the operating environment in terms of values of a set of environment variables 45, and (2) in the action field 44, identifying a particular action or actions to be taken when the operating environment is in that condition. More details and examples are provided below. The structure 22 can be seen as a form of content-addressable memory, wherein the contents of action field 44 are retrieved by pattern-matching an input value, shown as a Context Vector 46, to the environment field 42 of the configuration objects 40.

Also shown is a resolver 48, which may have a separate management or administrative (ADMIN) interface. As described more below, the resolver 48 is responsible for generating a resolved action value 50 by applying a resolution strategy to a set of action values 52 retrieved from the configuration structure 22. The term "resolution" reflects that in some cases there may be conflicts among the set of retrieved action values 52, and in such cases the conflicts must be resolved in order to arrive at a particular action to be taken. More generally, the resolver 48 is used to synthesize a single resolved action value 50 from a collection of generally different action values in the set 52.

It will be appreciated that FIG. 3 is schematic in nature. A software implementation of this scheme will typically include iteration at the stage of comparing the environment variables of the context vector 46 to the contents of the environment field 42 of the configuration objects, along with iteratively collecting the contents of the action field 44 of matching configuration objects to form the set 52. The configuration objects 40 may be arranged in some particular manner for efficiency in this processing while retaining their logical independence as described herein. For example, if there are very common use cases, the configuration objects 40 for those use cases may be arranged to be searched early in the processing. There may be a variety of techniques that can be employed along these lines.

Figure 4:
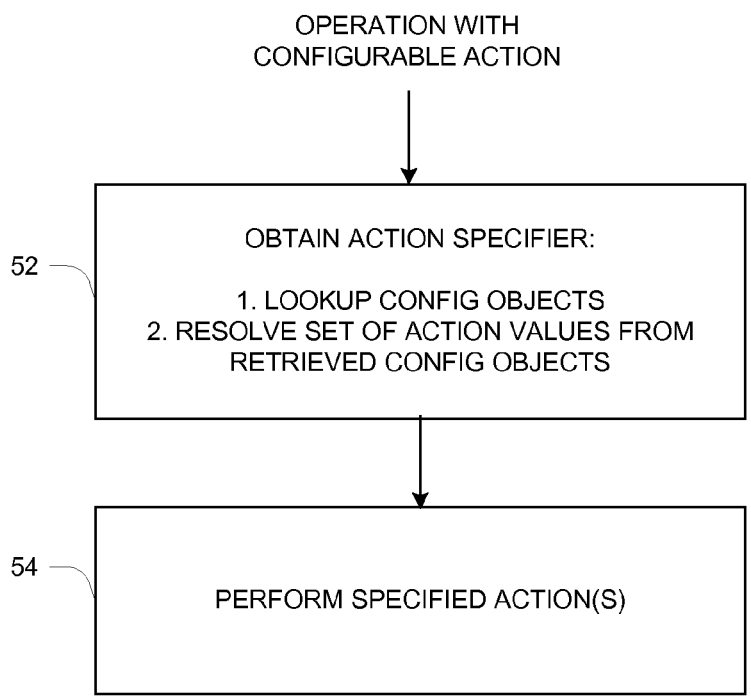
FIG. 4 is a high-level flow diagram of certain operation of the computer system.

FIG. 4 shows operation of the security application 16 related to use of the information stored in the configuration structure 22. When the security application 16 performs an operation that includes one or more configurable actions (i.e., actions that may differ depending on how the security application 16 has been configured), at 52 the security application 16 first obtains an action value that specifies an action to be performed according to the configuration. This includes (1) looking up and retrieving a set of configuration objects 40 stored in the configuration structure 22, and (2) resolving a set of action values 52 taken from the retrieved configuration objects 40 to arrive at a resolved specific action or actions. Then at 54 the specified action(s) is/are performed in the course of performing the security operation.

More particularly with reference to both FIG. 4 and FIG. 3, during the processing at 52, the security application 16 generates a context vector 46 that includes current values of different environment variables that are pertinent to operation because the action to be taken is dependent on the state of the operating environment. Continuing with the example above, the manner in which a user is authenticated may vary depending on whether the user is logged in locally to the client machine 12 (signifying physical access that might imply some level of existing authorization) or is logged in remotely over a public network (signifying a greater likelihood that the user is an unauthorized fraudster). In this case, one environment variable might be "access type" and have two possible values—"local" and "remote".

The contents of the context vector 46 are compared against the contents of the environment field 42 of the configuration objects 40 to identify those that match. This is indicated by the set of downward-directed arrows at the left, leading away from the context vector 46. For each configuration object 40 whose environment field contents match the context vector 46, the contents of the action field 44 are included in the set of action values 52. This is indicated by the set of downward-directed arrows at the right, leading into the resolver 48. In the simple example of two distinct environment variables, one variable from the context vector 46 may match the corresponding value in the environment field 42 of one configuration object, while another variable from the context vector 46 matches the corresponding value in the environment field 42 of another configuration object. The action values from the action field 44 of these two matching configuration objects together form the set of action values 52.

Once the set of action values 52 are identified, they are processed by the resolver 48 as mentioned above to generate the resolved action value 50, which in turn identifies the particular action(s) to be taken by the security application 16 in the specific current operating environment as reflected in the context vector 46.

As outlined above, an important feature of the context structure 22 is the relative independence among the configuration objects 40. In known approaches including the hierarchical approach described above, configuration information may be structured in a way that reflects certain dependencies, implicit or explicit, among different pieces of configuration information. Such an organization can be very constraining and inflexible, and it also can present performance issues such as the need to traverse a tree-like structure to retrieve information. The exact dependencies may not even be known at a time of designing the configuration structure, or they may change over the operational life of an application (e.g., security application 16) using the configuration structure. Also, a hierarchical or similar organization may not scale well for use in applications having a large number of relevant environment variables, which may also be referred to as "dimensions".

In contrast, the configuration objects 40 of the context structure 22 may be specified much more independently, which can greatly simplify initial configuration as well as re-configuration even for a large number of dimensions. It also can provide performance benefits by separating the retrieval of raw, high-dimensionality configuration information from the task of merging or resolving the configuration information into a particular value used for a particular environmental condition.

Two particular uses of the disclosed technique are briefly described.

The first is referred to as multi-dimensional configuration in an adaptive-authentication (AA) risk model used in providing AA services. A risk engine employing an AA risk model needs to perform different calculations in different contexts. An AA context is a multi-dimensional vector (context vector) of specific current values of environment variables. In one simplified example the environment variables (dimensions) are "Tenant", "Channel" and "Event Type", where values for Channel may include "WEB", "MOBILE", and "PHONE", and values for Event Type may include "LOGIN", "PAYMENT", and "CHANGE_EMAIL". In this case the order of importance of the dimensions may be unclear. For example, it may unclear whether "Channel" is more important than "Event Type" or vice-versa.

A second use is referred to as multi-dimensional configuration in policy management (PM). In this case an application applies different policies to respond differently in different operating contexts, which again are represented as multi-dimensional vectors of specific current values of environment variables. When policies are added to an application they may be arbitrarily assigned an order of importance. For example consider the following policies in the context of an adaptive authentication application:

1. If the account is a VIP account ALLOW access (don't hamper the user experience for VIP account)
2. If the location of the user is a country from which a lot of fraud originates then DENY access (suspected fraud attempt)

Each of the above policies is specified for different variables—account type for the first, and country of access for the second. If only one policy is implicated for a given event/request, it can be applied. But if multiple policies are implicated, there may be a question about what should be done. This is especially true if the actions of the policies are in conflict. This situation can arise in the above example when a VIP is accessing his/her account from a suspicious country. In this case, the policies have conflicting ALLOW/DENY actions. Using the hierarchical organization of FIG. 2 would force one to be of higher importance for all time, or it may require creating a complicated set of specific rules such as the following:

1. "if VIP account and suspicious country and event type LOGIN then ALLOW"
2. "if VIP account and suspicious country and event type STOCK TRADE then DENY"
3. "if VIP account and suspicious country and event type PAYMENT then CHALLENGE"

and then assigning these rules the appropriate priority. Having these very specific rules make the rules list much harder to manage. Also, if the number of policies is large, the problem of resolving conflicts or other differences between actions (in this case policy-based) is much more difficult.

Such problems can be addressed by creating the configuration scheme in a multi-dimensional way as illustrated in FIG. 3. In particular, the environment field 42 is allowed to contain a wildcard or "don't care" value for environment variables, enabling a configuration object 20 (such as a policy for example) to be specified for selected environment variables independently of others. In general for large-dimension configuration data, this may mean that multiple configuration objects 40 and their corresponding actions 44 are retrieved for a given value of the context vector 46. The resolution of the selected actions (set of action values 52) is done separately by the resolver 48. This separates the design and use of the configuration structure 22 for storing and retrieving configuration objects from the distinct task of resolving differences among them.

Below is an example configuration structure 22 that might be used in the above example of AA using a risk model having the three specific environment variables of Tenant, Channel and EventType. In particular, the configurable property in this case is a list of risk predictors to be calculated and used when evaluating risk for a particular request. Each row corresponds to a configuration object 40 of FIG. 3. The character "*" represents the wildcard value.

| | Environment Field 42 | | | Action Field 44 |
|---|---|---|---|---|
| Property | Tenant | Channel | EventType | Predictors to calculate |
| Predictors to calculate | * | WEB | * | User-Country age; Web device age; number of ISPs in last 10 days |
| Predictors to calculate | * | * | LOGIN | User-Country age; Days since last login, number of failed logins in last 5 minutes |
| Predictors to calculate | * | MOBILE | * | User-Country age; Mobile device age; number of ISPs in last 10 days; Ground speed |
| Predictors to calculate | * | * | PAYMENT | Days since last payment, number of payments to payee |

The first row specifies that if the channel of access is the Web (versus local), then the set of risk predictors {User-country age, Web device age, and number of ISPs from which this user has accessed the system in the last 10 days} are to be calculated and used in the overall risk calculation. The second row specifies that if the event type is Login, then the risk predictors {User-country age, Days since last login, and number of failed logins in last 5 minutes} are calculated and used in the overall risk calculation.

In the above example, if the security application 16 is invoked with the values {Tenant=ABC, Channel=WEB, EventType=LOGIN} in the context vector 46, matches occur for both rows. However, the actions specified in each row are different, so resolution is necessary.

The conflict resolver 48 resolves the differences. It may operate in any of a variety of ways according to the application. Also, its operation may be fixed or it may vary over time. For configuration values that are represented in lists or sets, resolution strategies could be one of the following for example:

1. Merge sets—perform a set theory operation on all actions specified in either set, such as Union, Intersection, Subtraction (set difference). If a union operation were used for the example, the resolved action value 50 would be the union set {User-Country age, Web device age, number of ISPs in last 10 days, Days since last login, # failed login attempts in last 5 minutes}.
2. Get First match (assumes a lower-level ordering of the configuration objects 40)—this strategy arbitrarily chooses just the contents from the first row according to the ordering. In the example above, the resolved action value 50 would be the set {User-Country age, Web device age, number of ISPs in last 10 days}.

Other potential strategies for resolution of configuration values represented in lists includes Get Maximal value and Get Minimal value. All of these are non-exclusive examples; other strategies may be used.

Figure 5:
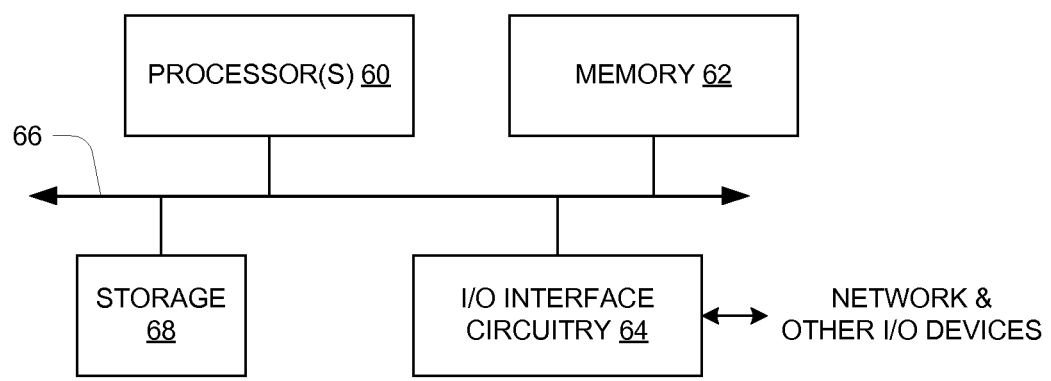
FIG. 5 is a schematic block diagram of a computer.

FIG. 5 shows an example configuration of a physical computer such as a server 10 or client 12 from a computer hardware perspective. The hardware includes one or more processors 60, memory 62, and interface circuitry 64 interconnected by data interconnections 66 such as one or more high-speed data buses. The interface circuitry 64 provides a hardware connection to the network 14 (FIG. 1) and perhaps other external devices/connections (EXT DEVs). The processor(s) 60 with connected memory 62 may also be referred to as "processing circuitry" herein. There may also be local storage 68 such as a local-attached disk drive or Flash drive. In operation, the memory 62 stores data and instructions of system software (e.g., operating system) and one or more application programs (e.g., security application 16) which are executed by the processor(s) 40 to cause the hardware to function in a software-defined manner. Thus the computer hardware executing instructions of the information security application 16, for example, can be referred to as an information security circuit or information security component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a server computer executing an information security application to provide information security services to a client computer, comprising:
   in response to a request from the client computer for a security operation, generating a context vector and performing a lookup in a configuration structure to identify a configurable action to be taken as part of the operation, the context vector including a set of current values of respective environment variables, the configuration structure storing configuration objects each having an environment field and an action field, the environment field storing configured values of the environment variables to specify a context for use of an action value stored in the action field, the configured values including predefined specific values and a wildcard value indicating that a context for use of the action value of a given configuration object is independent of a given environment variable, the lookup resulting in identification of a set of the configuration objects whose respective configured values of the environment variables either are wildcards or match respective current values of the environment variables in the context vector;
   resolving a set of action values of the identified set of configuration objects to create a resolved action value specifying the configurable action to be taken; and
   performing the configurable action specified by the resolved action value and returning a response to the client computer based on a result of the configurable action.

2. A method according to claim 1, wherein each action value includes a set of action specifiers, and resolving the set of action values employs a set resolution strategy to resolve the respective sets of action specifiers of the action values to create a resolved set of action specifiers in the resolved action value.

3. A method according to claim 2, wherein the set resolution strategy is an operation in set theory and the resolved set is a set resulting from the operation on the set of action values.

4. A method according to claim 2, wherein the configuration objects are ordered and the set resolution strategy is a selection strategy selecting an ordered one of the configuration objects and taking the set of specifier values of the selected configuration objects as the resolved set.

5. A method according to claim 4, wherein the ordered one is the first one of the order.

6. A method according to claim 1, wherein the information security application is a risk-based adaptive authentication application operating according to a risk model, the configuration objects are identifiers of risk predictors to be calculated and used in an overall risk assessment calculation according to the risk model, and the response conveys a risk assessment according to the risk assessment calculation.

7. A method according to claim 6, wherein the risk predictors include values for a user location, recent use of different access networks, time since last access, and recent access failure rate.

8. A method according to claim 1, wherein the configurable action is a policy-based action and the configuration objects are specifications of policies to be used based on the current operating environment, and the response conveys a hard decision or instruction resulting from the policy-based action.

9. A method according to claim 1, wherein resolving the set of action values selects all non-conflicting action values for inclusion in the resolved action value and selects from among conflicting action values according to a conflict-resolution strategy for inclusion in the resolved action value.

10. A method according to claim 9, wherein the conflict-resolution strategy is a configured strategy provided by an administrator of the security application.

11. A non-transitory computer-readable medium storing a set of computer program instructions of an information security application executable by a server computer to cause the server computer to perform a method providing information security services to a client computer, the method including:

in response to a request from the client computer for a security operation, generating a context vector and performing a lookup in a configuration structure to identify a configurable action to be taken as part of the operation, the context vector including a set of current values of respective environment variables, the configuration structure storing configuration objects each having an environment field and an action field, the environment field storing configured values of the environment variables to specify a context for use of an action value stored in the action field, the configured values including predefined specific values and a wildcard value indicating that a context for use of the action value of a given configuration object is independent of a given environment variable, the lookup resulting in identification of a set of the configuration objects whose respective configured values of the environment variables either are wildcards or match respective current values of the environment variables in the context vector;

resolving a set of action values of the identified set of configuration objects to create a resolved action value specifying the configurable action to be taken; and performing the configurable action specified by the resolved action value and returning a response to the client computer based on a result of the configurable action.

12. A computer-readable medium according to claim 11, wherein each action value includes a set of action specifiers, and resolving the set of action values employs a set resolution strategy to resolve the respective sets of action specifiers of the set of action values to create a resolved set of action specifiers in the resolved action value.

13. A computer-readable medium according to claim 12, wherein the set resolution strategy is an operation in set theory and the resolved set is a set resulting from the operation on the set of action values.

14. A computer-readable medium according to claim 12, wherein the configuration objects are ordered and the set resolution strategy is a selection strategy selecting an ordered one of the configuration objects and taking the set of specifier values of the selected configuration objects as the resolved set.

15. A computer-readable medium according to claim 14, wherein the ordered one is the first one of the order.

16. A computer-readable medium according to claim 11, wherein the information security application is a risk-based adaptive authentication application operating according to a risk model, the configuration objects are identifiers of risk predictors to be calculated and used in an overall risk assessment calculation according to the risk model, and the response conveys a risk assessment according to the risk assessment calculation.

17. A computer-readable medium according to claim 16, wherein the risk predictors include values for a user location, recent use of different access networks, time since last access, and recent access failure rate.

18. A computer-readable medium according to claim 11, wherein the configurable action is a policy-based action and the configuration objects are specifications of policies to be used based on the current operating environment, and the response conveys a hard decision or instruction resulting from the policy-based action.

19. A computer-readable medium according to claim 11, wherein resolving the set of action values selects all non-conflicting action values for inclusion in the resolved action value and selects from among conflicting action values according to a conflict-resolution strategy for inclusion in the resolved action value.

20. A computer-readable medium according to claim 19, wherein the conflict-resolution strategy is a configured strategy provided by an administrator of the security application.

* * * * *